United States Patent
Ray (10) Patent No.: US 8,738,480 B2
(45) Date of Patent: May 27, 2014

(54) VIRTUAL ELECTRONIC PAYMASTER METHOD AND SYSTEM

(75) Inventor: Elton T. Ray, Lakeville, NY (US)

(73) Assignee: Xerox Corporation, Norwalk, CT (US)

( * ) Notice: Subject to any disclaimer, the term of this patent is extended or adjusted under 35 U.S.C. 154(b) by 274 days.

(21) Appl. No.: 12/963,093

(22) Filed: Dec. 8, 2010

(65) Prior Publication Data
US 2012/0150705 A1    Jun. 14, 2012

(51) Int. Cl.
| G06F 15/02 | (2006.01) |
| G07C 1/10 | (2006.01) |
| G06F 3/12 | (2006.01) |
| G06F 15/00 | (2006.01) |
| G06K 1/00 | (2006.01) |

(52) U.S. Cl.
USPC ............................................. 705/32; 358/1.1

(58) Field of Classification Search
USPC .......................................................... 705/32
See application file for complete search history.

(56) References Cited

U.S. PATENT DOCUMENTS

| 3,783,755 | A | * | 1/1974 | Lagin .............................. 355/40 |
| 5,459,657 | A | * | 10/1995 | Wynn et al. ..................... 705/32 |
| 5,717,867 | A | * | 2/1998 | Wynn et al. ..................... 705/32 |
| 5,920,405 | A | | 7/1999 | McIntyre et al. ............. 358/442 |
| 6,695,427 | B2 | * | 2/2004 | Murata et al. .................... 347/19 |
| 6,802,005 | B1 | * | 10/2004 | Berson .......................... 713/178 |
| 6,883,709 | B2 | * | 4/2005 | Joseph .......................... 235/381 |
| 7,474,428 | B2 | * | 1/2009 | Morris-Jones et al. ...... 358/1.15 |
| 7,525,676 | B2 | | 4/2009 | Pesar ............................ 358/1.13 |
| 7,587,079 | B2 | | 9/2009 | Marlett et al. ................ 382/139 |
| 7,819,309 | B1 | * | 10/2010 | Warren et al. ................. 235/379 |
| 2003/0088514 | A1 | | 5/2003 | Sesek ............................... 705/43 |
| 2003/0236746 | A1 | * | 12/2003 | Turner et al. ..................... 705/40 |
| 2004/0044606 | A1 | * | 3/2004 | Buttridge et al. ............... 705/35 |
| 2004/0056889 | A1 | * | 3/2004 | Katano ......................... 345/741 |
| 2005/0080649 | A1 | * | 4/2005 | Alvarez et al. ..................... 705/1 |
| 2006/0161501 | A1 | * | 7/2006 | Waserstein et al. ............. 705/65 |
| 2006/0257188 | A1 | | 11/2006 | Kroetsch et al. ................ 400/76 |
| 2006/0279772 | A1 | | 12/2006 | Ludwig et al. ............... 358/1.15 |
| 2007/0056041 | A1 | * | 3/2007 | Goodman ....................... 726/26 |
| 2007/0186106 | A1 | * | 8/2007 | Ting et al. ..................... 713/168 |
| 2009/0094561 | A1 | * | 4/2009 | Do et al. ....................... 715/863 |
| 2009/0114716 | A1 | * | 5/2009 | Ramachandran ............. 235/379 |

OTHER PUBLICATIONS

Extensible Interface Platform, Xerox Corporation.

* cited by examiner

*Primary Examiner* — Seye Iwarere
(74) *Attorney, Agent, or Firm* — Kermit D. Lopez; Luis M. Ortiz; Ortiz & Lopez, PLLC (57) ABSTRACT

A virtual electronic paymaster system and method for processing a paycheck utilizing a multi-function device. A virtual paymaster application can be configured in association with an EIP (Extensible Interface Platform) enabled multi-function device in order to render the paycheck with respect to an employee. An identification card having a bar code can be placed on a platen of the multi-function device in order to obtain authentication data with respect to the employee upon providing a PIN number via a user interface. The authentication data can be further provided to a remote application server via a network in order to retrieve the payment information with respect to the employee from a payroll database. The paycheck can be locally rendered based on the rendering instructions from the remote application server thereby enhancing the payroll processing within a business environment.

20 Claims, 7 Drawing Sheets

VIRTUAL ELECTRONIC PAYMASTER METHOD AND SYSTEM

TECHNICAL FIELD

Embodiments are generally related to electronic payroll processing methods and systems. Embodiments are also related to multi-function devices such as, for example, printers, scanners, photocopy machines, and the like. Embodiments are additionally related to methods for processing paychecks.

BACKGROUND OF THE INVENTION

Payroll processing involves the distribution of wages with respect to employees within a business organization by accounting for various types of withholdings such as, for example, taxes, insurance payments, credits, reimbursements, bonuses, etc. A payroll processing system can be configured to maintain payroll information such as employee compensation, pay periods, deductions and tax status in order to deliver an appropriate payment via a printed paycheck and/or a deposit advice notice with respect to a particular employee.

Payroll departments can distribute paychecks to employees electronically, manually and/or via the postal service. One prior art payroll approach, for example, involves the use of an in-house payroll mode for processing and delivering paychecks. Such an approach requires dedicated payroll personnel for handing out the paychecks in the business environment. Another prior art technique involves the use of a third-party service for mailing the paychecks to the employee. Such prior art approaches, however, are a costly and time-consuming, and place an added burden on the employees who work on-field or change addresses frequently such as, for example, military service personnel, or recipients working in a foreign country. Furthermore, a direct deposit approach is not possible in the case of low-income employment and/or a temporary employment scenario, where mailing the paychecks and setting up a direct deposit account may not be desired and feasible.

Based on the foregoing, it is believed that a need exists for an improved virtual electronic paymaster system and method for efficiently processing a paycheck, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved virtual electronic paymaster system and method.

It is another aspect of the disclosed embodiments to provide for an improved networked rendering device such as, for example, a printer, scanner, photocopy machine, fax machine, and/or an MFD.

It is a further aspect of the disclosed embodiments to provide for an improved system and method for virtually processing a paycheck utilizing a multi-function device.

The aforementioned aspects and other objectives and advantages can now be achieved as described herein. A "virtual" electronic paymaster system and method for efficiently processing a paycheck is disclosed herein. A virtual paymaster application can be configured in association with a rendering device, such as, for example, an EIP (Extensible Interface Platform) enabled MFD, in order to render the paycheck with respect to an employee. An identification card (e.g., a credit card, a badge) having a bar code can be placed on a platen of the MFD in order to obtain authentication data with respect to the employee upon providing a PIN (personnel identification number) number via a user interface. The authentication data can be further provided to a remote application server via a network in order to retrieve the payment information (current/pending payments) with respect to the employee from a payroll database. The paycheck can be locally rendered based on a rendering instruction from the remote application server in order to enhance the payroll processing within a business environment.

The paymaster application can be launched by tapping a graphically displayed paycheck button on the user interface of the MFD. The identification card with respect to the employee can be placed on the platen upon receiving a user prompt from the paymaster application. The MFD can be communicated with the application server via a standard SSL (Secure Sockets Layer)-encrypted connection in order to provide an adequate protection with respect to the identification card/PIN number of the employee.

The paymaster system can be operated in a failsafe mode by determining a fault condition such as, for example, paper jam, out of toner, or blemish in the MFD and a fault message can be transmitted to the application server in order to cancel the paycheck and credit the payment into the employee account. A confirmation can be provided with respect to the paycheck in order to confirm the payment in the MFD. Similarly, the paycheck can be canceled and the payment can be credited to the employee account when the user terminates the payment process in the MFD. Such an approach provides an improved application programming interface that permits the multi-function device to provide specialized payroll services above and beyond the standard capabilities.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, one or more of the disclosed embodiments can be embodied as a method, system, or computer program usable medium or computer program product. Accordingly, the disclosed embodiments can in some instances take the form of an entirely hardware embodiment, an entirely software embodiment or an embodiment combining software and hardware aspects all generally referred to herein as a "module" Furthermore, the disclosed embodiments may take the form of a computer usable medium or computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.) The computer program code, however, for carrying out operations of the present invention may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The disclosed embodiments are described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
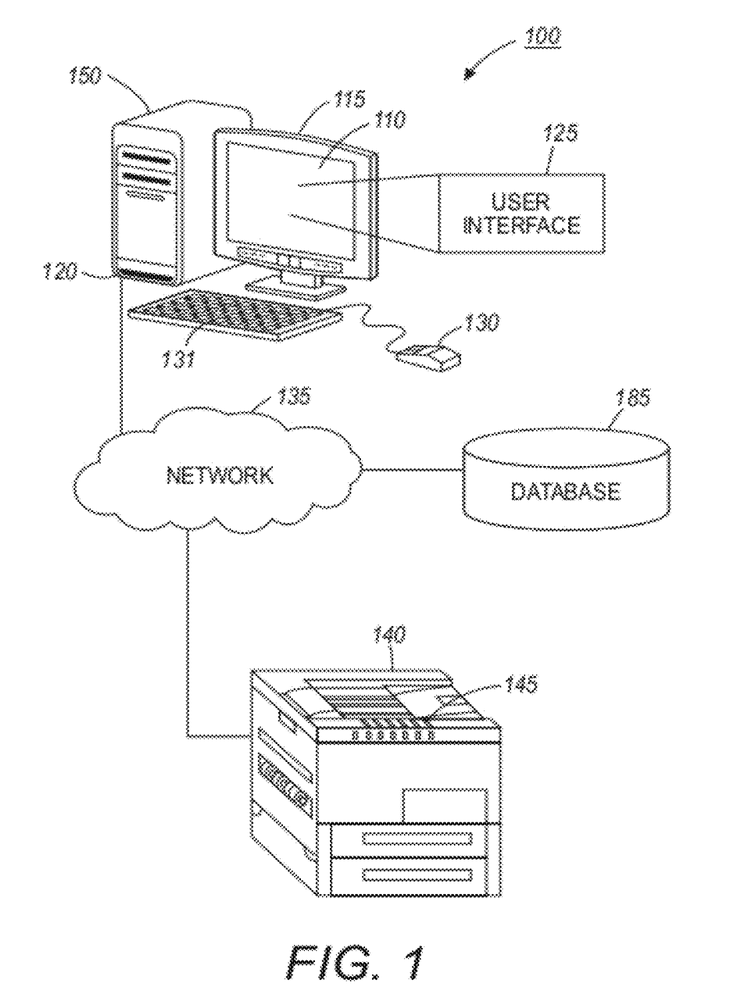
FIG. 1 illustrates an example of a rendering device coupled to a data-processing apparatus through a network, in accordance with the disclosed embodiments.

Referring to FIG. 1, system 100 can be configured to include one or more networked devices, such as networked device 140, coupled to a data-processing apparatus 110 through a network 135. In some embodiments, networked device 140 may be a rendering device such as a printer, scanner, copy machine, etc. In other embodiments, networked device 140 may be, for example, an MFD, a file server and/or a print server. The data-processing apparatus 110 may be, for example, a personal computer or other computing device, and generally includes a central processor 120, a display device 115, a keyboard 131, and a pointing device 130 (e.g., mouse, track ball, pen device, or the like). Additional input/output devices, such as the rendering device 140 may be included in association with the data-processing apparatus 110 as desired.

Note that as utilized herein, the term networked device may refer to an apparatus or system such as a printer, scanner, fax machine, copy machine, etc., and/or a combination thereof (e.g., an MFD). Preferably, networked device 140 is an MFD capable of multiple rendering functions such as printing, copying, scanning, faxing, etc. In some embodiments, the rendering device 140 may be implemented with a single rendering function such as printing. In other embodiments, the rendering device 140 can be configured to provide multiple rendering functions, such as scanning, faxing, printing and copying.

A non-limiting example of an MFD that can be utilized as rendering device 140 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of an MFD that can be utilized as rendering devices 140 is disclosed in U.S. Pat. No. 7,474, 428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of an MFD that can be utilized as rendering devices 140 is disclosed in U.S. Pat. No. 5,920,405, entitled "Multifunction Device With Printer Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn.

The data-processing apparatus 110 can be coupled to the rendering device 140 (and other rendering devices) through a computer network 135. Network 135 may employ any network topology, transmission medium, or network protocol. The network 135 may include connections, such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

The networked device 140 includes a user interface 145, such as a panel menu. The panel menu may be used to select features and enter other data in the device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a print job with the driver for processing by the rendering device 140.

The data-processing apparatus 110 also includes a GUI 125 for communicating rendering features for processing, for example, a print job to a user and accepting the user's selection of available rendering features. The user interface 125 displays information and receives data through device display and/or the keyboard/mouse combination. The interface 125, also serves to display results, whereupon the user may supply additional inputs or terminate a given session. The data-processing apparatus 110 can be, for example, any computing device capable of being integrated within a network, such as a PDA, personal computer, cellular telephone, point-of-sale terminal, server, etc.

The input device of the networked device 140, for example, may be a local user interface 125, such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the present invention, which can be embodied in the context of a data-processing apparatus 110 and networked device 140 depicted in FIG. 1. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 2:
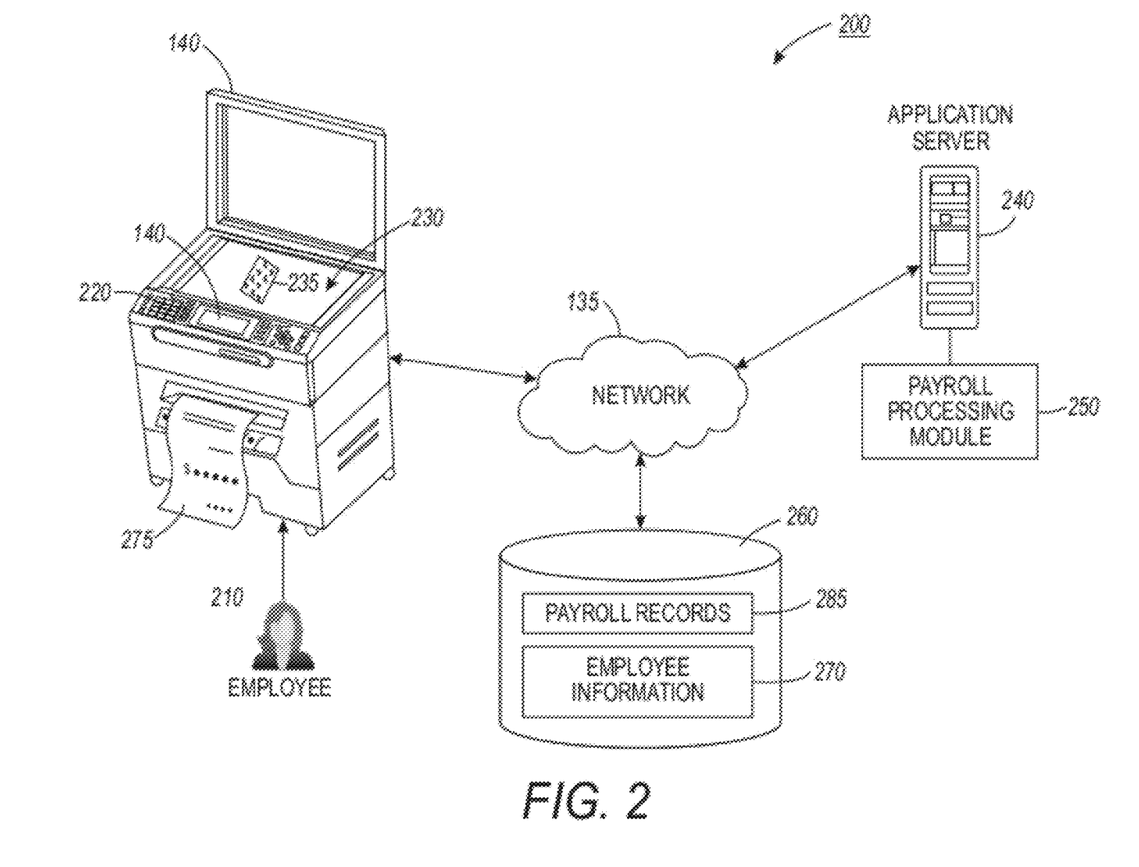
FIG. 2 illustrates a graphical representation of a virtual electronic paymaster system with a multi-function device (MFD), in accordance with the disclosed embodiments.

FIG. 2 illustrates a graphical representation of a "virtual" electronic paymaster system 200 with a multi-function device (MFD) 140, in accordance with the disclosed embodiments. Note that in FIGS. 1-11, identical or similar blocks are generally indicated by identical reference numerals. Note additionally that the term "virtual" as utilized herein can have several meanings and is utilized in the context of computing and information technology. In one sense, "virtual" can refer to software systems and associated methods that function as if they were hardware systems (e.g., virtual machine, virtual memory, virtual disk, etc) of computer-generated simulations of reality (e.g., virtual reality), and of Internet gaming environments, for example wherein entire worlds are created (e.g., virtual world) or the real world is supplemented with virtual images (e.g., augmented reality). Other applications of the word "virtual" include virtual community, virtual library, virtual class, and so forth.

In general, Internet and communications technology fosters the de-coupling of space where events happen, and storage technologies facilitate de-coupling of time between a message being sent and received. These technologies build the environment for virtual work in teams, with members who may never meet each other in person. Communicating by telephone and e-mail, with work products shared electronically, virtual teams produce results without being co-located. Similarly, a virtual world is a type of habitation founded upon web technology that allows interactions for pursuits, such as economy and real estate.

The virtual electronic paymaster system 200 depicted in FIG. 2 thus generally includes the MFD 140 illustrated earlier with respect to FIG. 1, along with a remote application server 240, and a payroll database 260 that are operatively configured in association with the network 135. Data-processing system 110 depicted in FIG. 1 can be, for example, the remote application server 240. The MFD 140 can be located remotely with respect to the application server 240, or alternatively, they may be located locally with respect to the server 240.

The MFD is an office machine which incorporates the functionality of multiple devices in one, so as to provide centralized document management, document distribution and production in a large-office setting and the like. The typical MFD may act as a combination of a printer, scanner, photocopier, fax and e-mail. While the MFD 140 is shown by way of example, it is to be appreciated that any number of MFDs may be linked to the network 135, such as three, four, six or more MFDs. In general, the MFD 140 can be employed to perform a rendering output function (e.g., printing, scanning, copying, faxing, etc.) within a networked environment.

The MFD 140 includes the user interface 145, a keypad 220 and a platen 230. The platen 230 of the MFD 140 can be a transparent glass plate housed with a scanning unit with an upper face exposed. The platen 230 has a rectangular shape extending in a left-right direction in order to scan the objects such as, for example, an identification card 235 of the employee 210. Note that the platen 230 can be also employed to scan other types of objects such as, documents and books in the MFD 140. The payroll database 260 can be employed to store the payroll records 265 and the employee information 270 with respect to the employee 210 in the business organization. The application server 240 of the paymaster system 200 includes a payroll processing module 250 that can be employed to process the paychecks 275 with respect to the employee 210.

Figure 3:
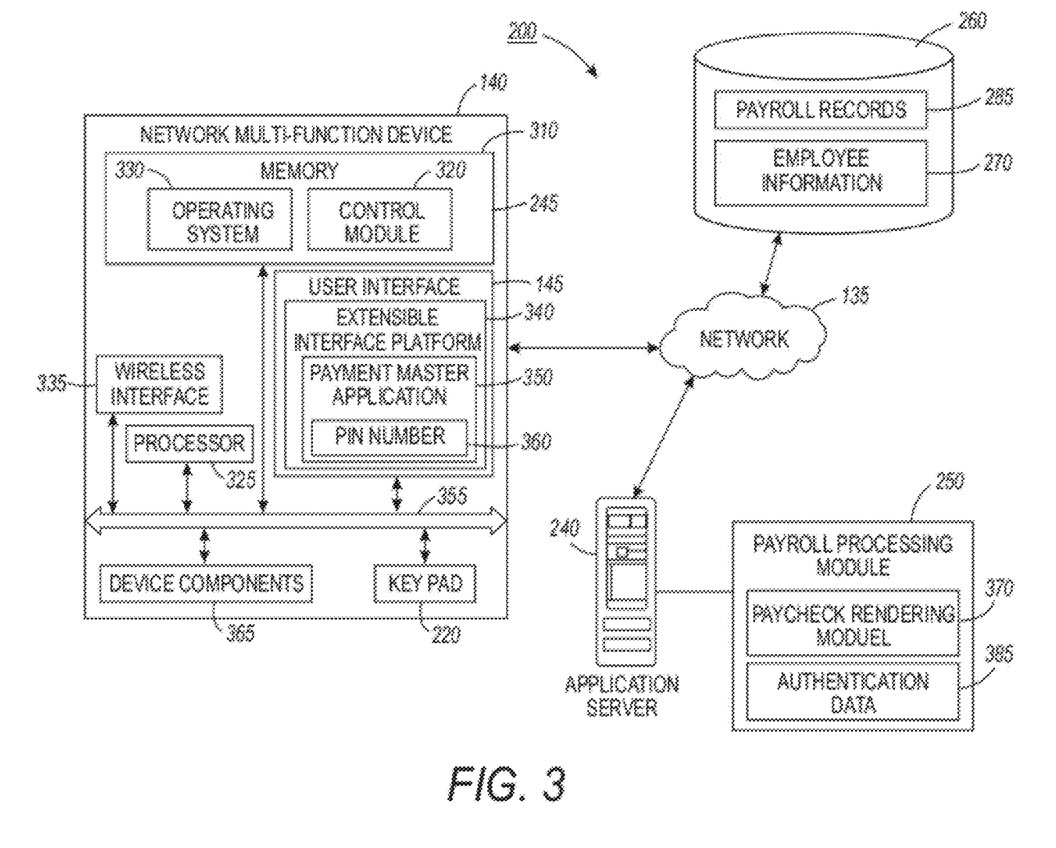
FIG. 3 illustrates a block diagram of the virtual electronic paymaster system, in accordance with the disclosed embodiments.

FIG. 3 illustrates a block diagram of the virtual electronic paymaster system 200 with the MFD 140, in accordance with the disclosed embodiments. The virtual electronic paymaster system 200 can be employed for processing a paycheck 275 with respect to the employee 210 in a wide range of business applications. The MFD 140 can be configured in association with a virtual paymaster application 350 in order to effectively process the paychecks 275 with respect to the employee 210. Note that the MFD 140 disclosed herein can be enabled to include an Extensible Interface Platform (EIP) 340. The EIP application 340 can be a software platform upon which a developer employs standard web-based tools to create server-based applications that can be configured for the rendering device user interface 145.

The MFD 140 further includes a processor circuit having a memory 310 and a processor 325 coupled to a local interface 335. The local interface 335 can be for example, a data bus with an accompanying control/address bus. The memory 310 stores an operating system 330 and a control module 320 that are executable by the processor 325. The MFD 140 also includes various rendering device components 365 such as motors and mechanical paper path components as well as image creation components. A wireless network interface 335 coupled to the local interface 355 facilitates wireless communication with respect to the MFD 140.

The paymaster application 350 generates a user prompt in order to alert the employee 210 to place the identification card 235 on the platen 230 of the MFD 140. Note that the identification card 235 can be such as, for example, but not limited to a credit card and/or a badge having a barcode. It can be appreciated that other types of identification cards may be utilized in place of the suggested identification card 235. The MFD 140 retrieves an authentication data 385 with respect to the employee 210 upon providing a PIN (personnel identification number) number 360. The authentication data 385 can be transmitted to the remote application server 240 via the network 135 in order to receive the payment information with respect to the employee 210 from the payroll database 260.

The MFD 140 can be communicated with the application server 240 via a standard SSL (Secure Sockets Layer) encrypted connection in order to provide an adequate protection with respect to the identification card 235 and the PIN number 260 of the employee 210. The MFD 140 further generates the paycheck 275 based on the rendering instructions 370 from the remote application server 240 in order to provide enhanced payroll processing within the business environment. The paymaster system 200 can be also operated in a failsafe mode by determining a fault condition such as, paper jam, out of toner, or blemish in the MFD 140 and a fault message can be transmitted to the application server 240 in order to cancel the paycheck 275 and credit the payment into the employee account.

Figure 4:
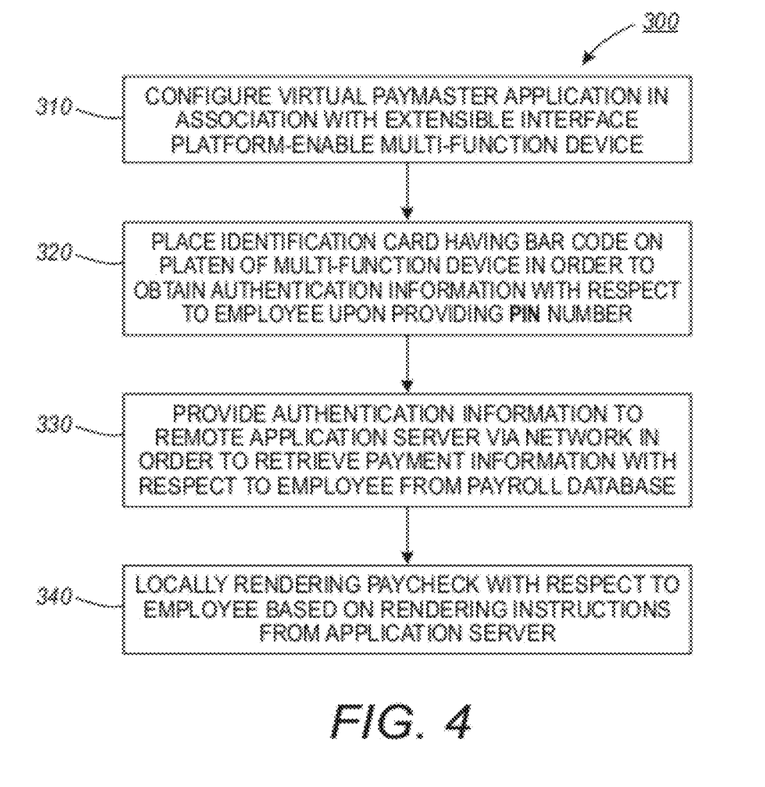
FIG. 4 illustrates a high level flow chart of operation illustrating logical operational steps of a method for virtually processing a paycheck utilizing the MFD, in accordance with the disclosed embodiments.
Figure 5:
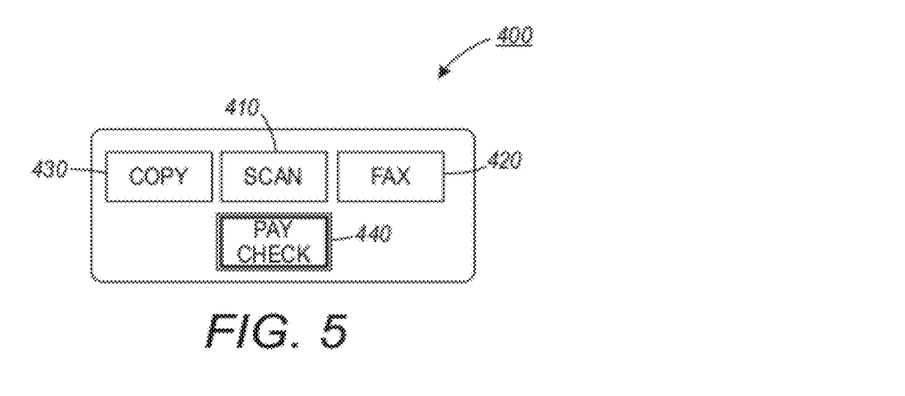
FIG. 5 illustrates a GUI representing a graphically displayed paycheck button at an user interface of the MFD, in accordance with the disclosed embodiments.

FIG. 4 illustrates a high level flow chart of operation illustrating logical operational steps of a method 300 for processing the paycheck 375 with respect to the employee 210 utilizing the MFD 140, in accordance with the disclosed embodiments. Again as a reminder, note that in FIGS. 1-11, identical or similar blocks are generally indicated by identical reference numerals. The paymaster application 350 can be configured in association with the extensible interface platform (EIP)-enabled MFD 140 in order to render the paycheck 375 with respect to the employee 210, as illustrated at block 310. FIG. 5 illustrates a GUI 400 representing a graphically displayed paycheck button 440, in accordance with the disclosed embodiments. The paymaster application 350 can be launched by tapping the graphically displayed paycheck button 440 on the user interface 145 of the MFD 140. The GUI 400 also includes a graphically displayed copy button 430, a scan button 410 and a fax button 420 in order to provide other operations such as, copying, scanning and faxing with respect to the MFD 140.

Note that the GUI 400-650 can be implemented utilizing a GUI such as, for example, the GUI 145 depicted in FIG. 2 herein, and may be provided by a module, such as, for example, module 250 (i.e., a software application). Note that in computing, a GUI window is generally a visual area containing some type of user interface (e.g., GUI 145). Such a "window" usually (but not always) possesses a rectangular shape, and displays the output of and may allow input to one or more processes. Such windows are primarily associated with graphical displays, where they can be manipulated with an input device, such as, for example, the keypad 220 or a touch screen of the multi-function device 140 depicted in FIG. 2. A GUI using "windows" as one of its main "metaphors" is often referred to as a windowing system.

Figure 6:
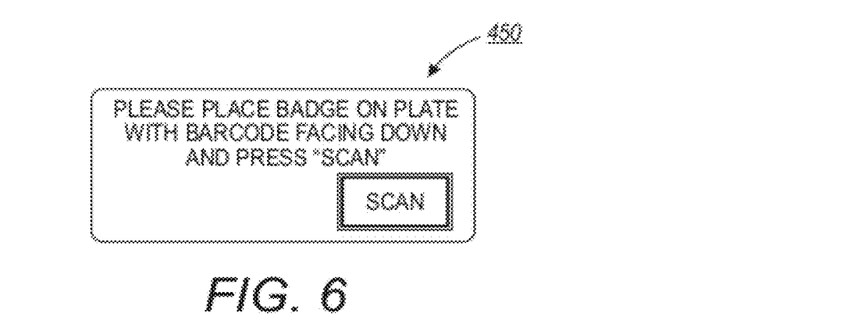
FIGS. 6-10 illustrate GUI representing various dialog boxes for processing the paycheck, in accordance with the disclosed embodiments.
Figure 7:
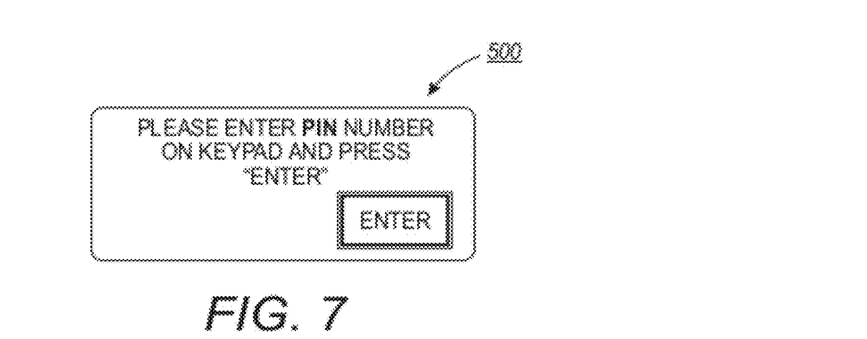

The identification card 235 having the bar code can be placed on the platen 230 of the MFD 140 in order to obtain the authentication data 385 with respect to the employee upon providing the PIN number 360, as depicted at block 320. FIG. 6 illustrates a GUI 450 representing a dialog box for placing the identification card 235 on the platen 230 of the MFD 140, in accordance with the disclosed embodiments. The identification card 235 can be placed on the platen 230 of the MFD 140 with the bar code facing down and a graphically displayed 'scan' button 460 can be activated in order to obtain the authentication data 385 with respect to the employee 210. FIG. 7 illustrates a GUI 500 representing a dialog box for entering the PIN number 360, in accordance with the disclosed embodiments. The paymaster application 350 permits the employee to enter the PIN number 360 via the keypad 220 of the MFD 140 upon scanning the identification card 235. The employee 210 can further provide the PIN number 360 and activate a graphically displayed 'enter' button in order to confirm the PIN number 360 entry in the MFD 140.

Figure 8:
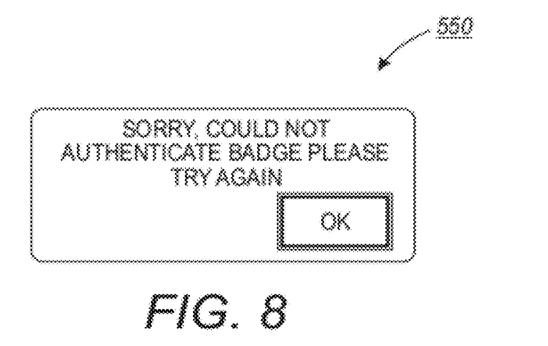
Figure 9:
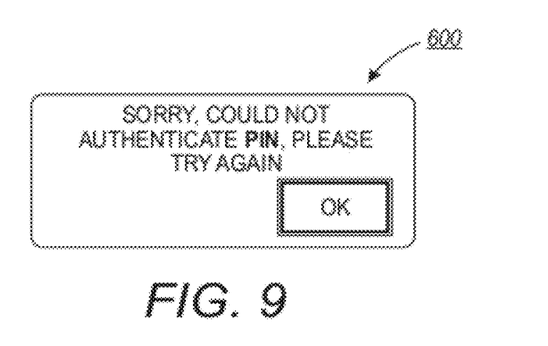

FIG. 8 illustrates a GUI 550 representing a dialog box with respect to an un-authorized identification card 235, in accordance with the disclosed embodiments. The paymaster application 350 terminates the payroll process with respect to an un-authorized identification card 235 and displays a termination message. The paymaster application can terminate the payroll process with respect to an un-authorized PIN number 260 and displays a termination message, as illustrated in FIG. 9. The authentication data 385 can be further provided to the remote application server 240 via the network 135 in order to retrieve the payment information 265 and 270 with respect to the employee 210 from the payroll database 260, as illustrated at block 330.

Figure 10:
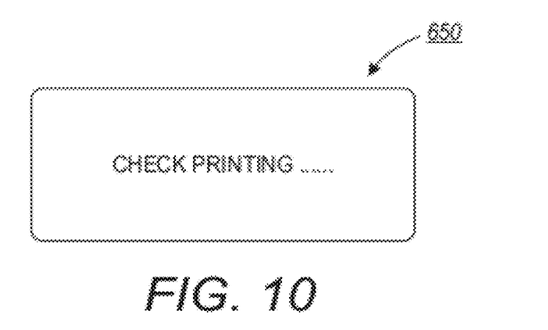

The paycheck 375 can be thereafter rendered based on the rendering instructions 370 from the remote application server 270, as depicted at block 340. FIG. 10 illustrates a GUI 650 representing a dialog box for rendering the paycheck in the MFD 140, in accordance with the disclosed embodiments. A confirmation can be provided upon receiving the paycheck 275 in order to confirm the check payment in the MFD 140. Similarly, the paycheck 275 can be canceled and payment can be credited to the employee account when the user terminates the payment process in the MFD 140.

Figure 11:
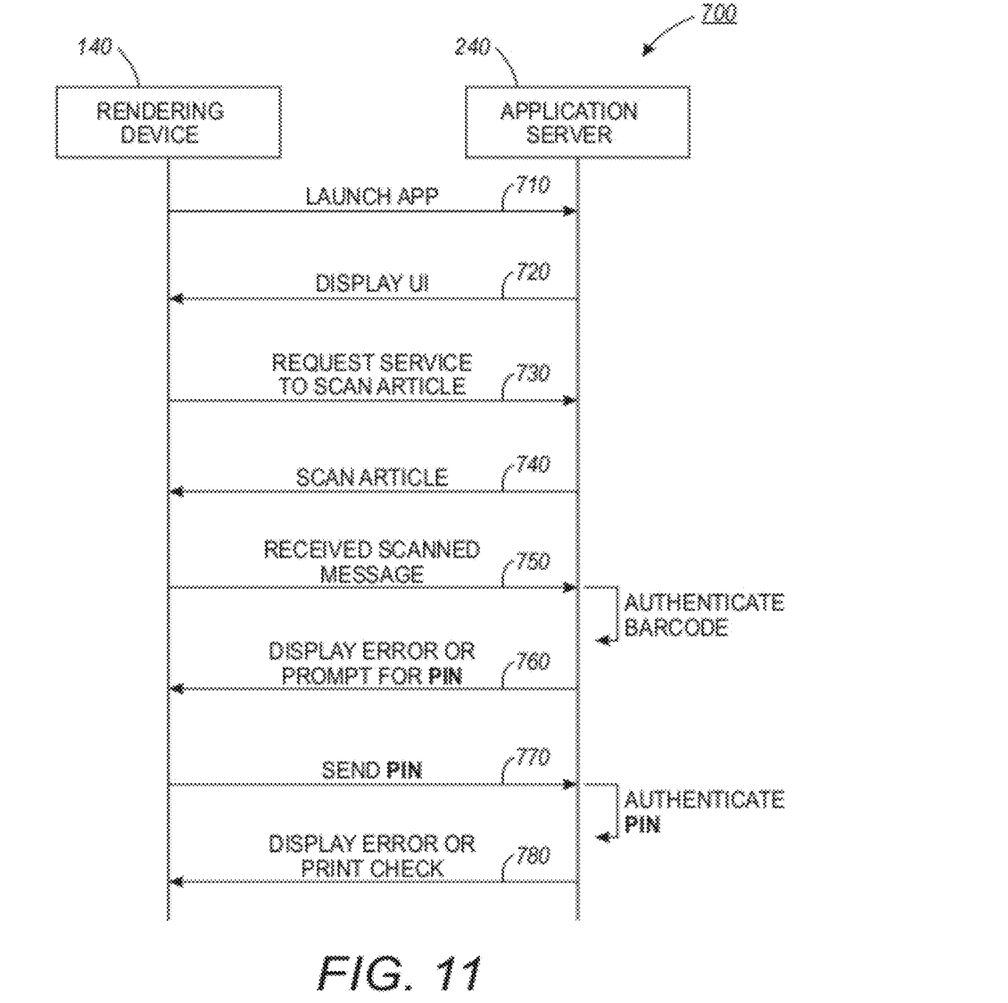
FIG. 11 illustrates a communication diagram illustrating communication steps between the MFD and a remote application server, in accordance with the disclosed embodiments.

FIG. 11 illustrates a communication diagram 700 illustrating process steps for processing the paycheck 375, in accordance with the disclosed embodiments. The paymaster application 350 can be configured in association with the MFD 140 by activating the graphically displayed paycheck button 460 in order to access the remote application server 240, as indicated by arrow 710. The paymaster application 350 can be displayed at the user interface 145 of the multi-function device 140, as indicated by arrow 720. A service request for scanning the identification card 235 with respect to the employee 210 can be generated at the multi-function device 140, as indicated by arrow 730. The identification card 235 can be scanned upon placing the identification card 230 on the platen 230 of the multi-function device 140 in order to obtain the authentication data 385, as indicated by arrow 740.

The authentication data 385 can be transmitted to the application server 240 in order to authenticate the barcode of the identification card 235, as indicated by arrow 750. An error report/a prompt for PIN number 260 can be displayed at the user interface 145 of the multi-function device 140, as indicated by arrow 760. The PIN number 260 can be further transmitted to the remote server 260 in order to obtain the payment information with respect to the employee 210, as indicated by arrow 770. The PIN number 260 can be verified utilizing the application server 240 and an error report/paycheck can be generated at the multi-function device 140, as indicated by arrow 780.

The system and method disclosed herein provides an improved application programming interface that permits the multi-function device to provide specialized services above and beyond the standard copy/scan/print/fax capabilities. The paymaster application effectively provides a cost-effective and secured distribution of payrolls to remote office locations. Such an approach therefore effectively manages and controls employee information and eliminates the workload on payroll department in a wide range of business organizations.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for processing a paycheck, said method comprising:
   placing an identification card having a bar code on a platen of a multi-function device;
   scanning said identification card with said multi-function device in order to obtain authentication data with respect to an employee via a virtual paymaster application configured via said multi-function device wherein said virtual paymaster application is a software application configured on said multi-function device and wherein said multi-function device is a document processing rendering device configured as a printer, scanner, fax machine, copy machine or a combination thereof;
   providing said authentication data to a remote application server via a network in order to retrieve a payment information with respect to said employee from a payroll database; and
   rendering locally on said multi-function device a paycheck based on at least one rendering instruction from said remote application server in order to thereafter virtually deliver said paycheck to said employee to enhance payroll processing within a business environment.

2. The method of claim 1 further comprising launching said paymaster application on a user interface of said multi-function device via a graphically displayed paycheck button.

3. The method of claim 1 further comprising placing said identification card on said platen of said multi-function device upon receiving a user prompt from said paymaster application.

4. The method of claim 1 further comprising communicating said multi-function device with said remote application server via a standard secure sockets layer encrypted connection.

5. The method of claim 1 further comprising:
   operating said paymaster application in a failsafe mode upon determining a fault in said multi-function device; and
   transmitting a fault message to said application server in order to cancel said paycheck and credit the payment into an employee account.

6. The method of claim 1 further comprising confirming said check payment in said multi-function device upon receiving said paycheck via a graphically displayed confirmation button.

7. The method of claim 1 further comprising crediting said payment to an employee account by canceling said paycheck when said employee terminates the payment process in said multi-function device.

8. The method of claim 1 wherein said identification card comprises at least one of the following types of cards: a credit card; and a badge.

9. The method of claim 1 wherein said multi-function device comprises an extensible interface platform enabled multi-function device.

10. A system for processing a paycheck, said system comprising:
   a virtual paymaster application and a multi-function device, wherein an identification card having a bar code is placed on a platen of a multi-function device and thereafter scanned by said multi-function device in order to obtain authentication data with respect to an employee via said virtual paymaster application configured via said multi-function device wherein said virtual paymaster application is a software application configured on said multi-function device and wherein said multi-function device is a document processing rendering device configured as a printer, scanner, fax machine, copy machine or a combination thereof;
   a remote application server and a network, wherein said authentication data is provided to said remote application server via said network in order to retrieve payment information with respect to said employee from a payroll database; and
   a rendering device for locally rendering on said multi-function device a paycheck based on at least one rendering instruction from said remote application server in order to thereafter virtually deliver said paycheck to said employee to enhance payroll processing within a business environment.

11. The system of claim 10 wherein said paymaster application is launchable on a user interface of said multi-function device via a graphically displayed paycheck button.

12. The system of claim 10 wherein said identification card is placed on said platen of said multi-function device upon receiving a user prompt from said paymaster application.

13. The system of claim 10 further comprising a communications medium for communicating said multi-function device with said remote application server via a standard secure sockets layer encrypted connection.

14. The system of claim 10 further comprising:
a failsafe mode, wherein said paymaster application is operable in said failsafe mode upon determining a fault in said multi-function device; and
a fault message that is transmittable to said application server in order to cancel said paycheck and credit the payment into an employee account.

15. The system of claim 10 wherein said check payment is confirmable via said multi-function device upon receiving said paycheck in response to a selection of a graphically displayed confirmation button.

16. The system of claim 10 wherein said payment is creditable to an employee account by canceling said paycheck when said employee terminates the payment process in said multi-function device.

17. The system of claim 10 wherein said identification card comprises at least one of the following types of cards: a credit card; and a badge.

18. The system of claim 10 wherein said multi-function device comprises an extensible interface platform enabled multi-function device.

19. A system for processing a paycheck, said system comprising:

a virtual paymaster application and a multi-function device, wherein an identification card having a bar code is placed on a platen of a multi-function device and thereafter scanned by said multi-function device in order to obtain authentication data with respect to an employee via said virtual paymaster application configured via said multi-function device wherein said virtual paymaster application is a software application configured on said multi-function device and wherein said multi-function device is a document processing rendering device configured as a printer, scanner, fax machine, copy machine or a combination thereof;

a remote application server and a network, wherein said authentication data is provided to said remote application server via said network in order to retrieve payment information with respect to said employee from a payroll database;

a rendering device for locally rendering on said multi-function device a paycheck based on at least one rendering instruction from said remote application server in order to thereafter virtually deliver said paycheck to said employee to enhance payroll processing within a business environment; and a communications medium for communicating said multi-function device with said remote application server via a standard secure sockets layer encrypted connection.

20. The system of claim 19 wherein:
said paymaster application is launchable on a user interface of said multi-function device via a graphically displayed paycheck button; and
said identification card is placed on said platen of said multi-function device upon receiving a user prompt from said paymaster application.

* * * * *